(12) United States Patent
Pichon et al.

(10) Patent No.: US 6,572,192 B2
(45) Date of Patent: Jun. 3, 2003

(54) SEATING DEVICE COMPRISING AT LEAST ONE PIVOTING SEAT ELEMENT

(75) Inventors: Hugues Pichon, Morigny (FR); Jean-Marc Perthuis, Beville le Comte (FR)

(73) Assignee: Faurecia Sieges d'Automobile S.A.2, Nanterre (FR)

( * ) Notice: Subject to any disclaimer, the term of this patent is extended or adjusted under 35 U.S.C. 154(b) by 0 days.

(21) Appl. No.: 10/100,623

(22) Filed: Mar. 18, 2002

(65) Prior Publication Data

US 2002/0140264 A1 Oct. 3, 2002

(30) Foreign Application Priority Data

Mar. 19, 2001 (FR) .............................................. 0103688

(51) Int. Cl.[7] .............................. B60N 2/00; A47C 7/02
(52) U.S. Cl. ................................... 297/335; 297/452.38
(58) Field of Search ................................ 297/335, 336, 297/452.38, 463.2, 461; 296/65.05, 65.01; 5/493

(56) References Cited

U.S. PATENT DOCUMENTS

| | | | | |
|---|---|---|---|---|
| 3,295,887 A | * | 1/1967 | Bacon ..................... | 297/188.2 |
| 3,751,107 A | * | 8/1973 | Greitzer ................... | 297/440.2 |
| 4,382,629 A | | 5/1983 | Froumajou | |
| 4,848,826 A | | 7/1989 | Kuwabara et al. | |
| 5,971,467 A | * | 10/1999 | Kayumi et al. ................ | 296/66 |
| 6,135,533 A | * | 10/2000 | Mack et al. ............. | 296/65.03 |
| 6,135,558 A | | 10/2000 | Behrens et al. | |
| 6,186,572 B1 | * | 2/2001 | Oh .......................... | 296/65.05 |

FOREIGN PATENT DOCUMENTS

| | | | | |
|---|---|---|---|---|
| DE | 3447040 A1 | * | 6/1986 | ............ B60N/1/02 |
| EP | 0 982 184 A2 | | 3/2000 | |
| FR | 2 420 445 | | 10/1979 | |

* cited by examiner

Primary Examiner—Peter M. Cuomo
Assistant Examiner—Sarah C. Burnham
(74) Attorney, Agent, or Firm—Marshall, Gerstein & Borun

(57) ABSTRACT

Seating device comprising a first element pivoting with respect to a second element around an axis, the first element comprising in particular a lower edge and two lateral edges. The device includes a rigid flap, secured in a pivoting manner along the transverse lower edge of the first element, this flap being prolonged laterally by two flexible turns that are secured in a pivoting manner along at least one part of the two lateral lower edges of the first element.

9 Claims, 3 Drawing Sheets

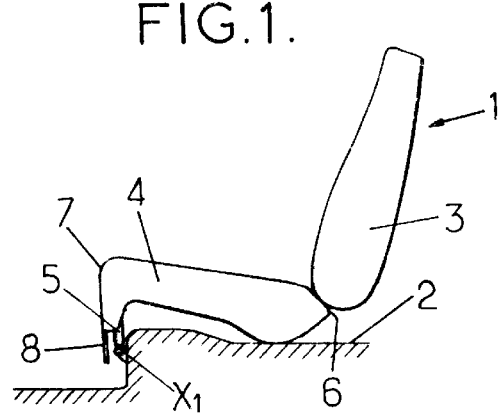
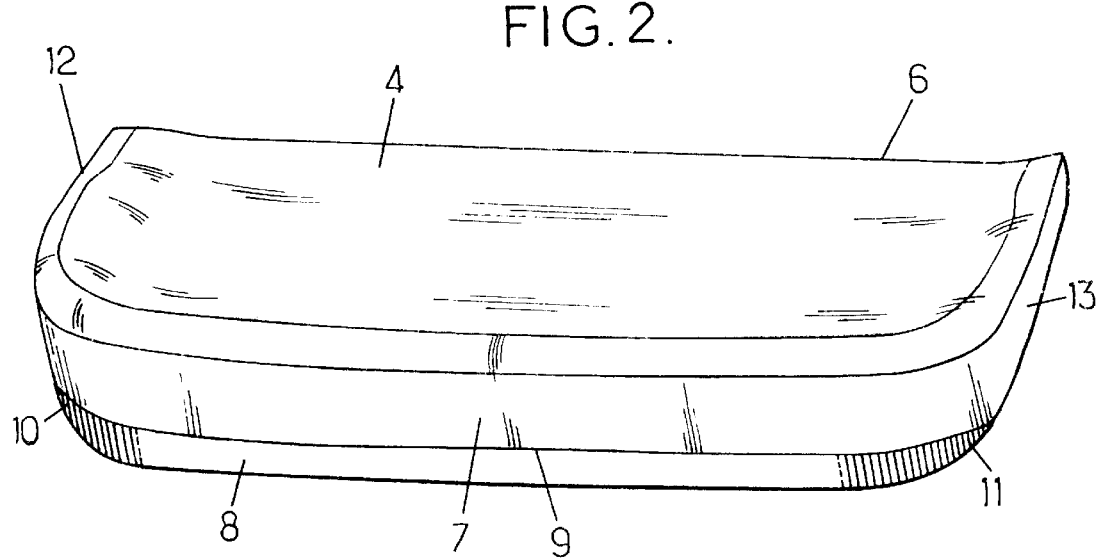

SEATING DEVICE COMPRISING AT LEAST ONE PIVOTING SEAT ELEMENT

FIELD OF THE INVENTION

This invention relates to a seat-unit comprising at least one pivoting seat element.

More particularly, the invention concerns a seating device comprising at least one first padded element, mounted so as to pivot with respect to a second element around a horizontal, transverse rotation axis, by at least one pivot, the first element comprising firstly, a transverse lower edge parallel to the rotation axis and neighboring said rotation axis, and secondly, two lateral lower edges extending the transverse lower edge substantially perpendicularly to the rotation axis.

BACKGROUND OF THE INVENTION

Document FR-A-2 420 445 describes an example of such a seating device in which the first element is a seat-bottom and in which the second element is the floor of the vehicle.

This known device has the disadvantage of leaving apparent the pivot(s) between the first and second elements, which can, on the one hand, represent a danger zone for the user (risk of pinching) and on the other, be unsightly.

OBJECTS AND SUMMARY OF THE INVENTION

One purpose of this invention is to compensate these disadvantages.

To this effect, according to the invention, a seating device of the type concerned is characterized it includes a substantially rigid flap that is pivotally secured along the transverse lower edge of the first element and which is normally in a substantially vertical rest position where said flap hides the pivot, said flap being laterally extended by two flexible turns that are pivotally secured along at least part of the two lateral lower edges of the first element, said turns and the first element having sufficient flexibility to allow the flap to pivot upward until it reaches an upright position by moving away from said turns under user action, the flexibility of the turns and a connection between said turns and the lateral edges of the first element being designed so that:

the flap is normally elastically maintained in its rest position by the turns, (this elastic maintenance can be achieved by the flexibility of the first padded unit and/or the flexibility of the turns if they can be deformed elastically), and when the flap is made to pivot to its upright position, said flap is elastically pulled upward toward the upright position as soon as said flap has exceeded a neutral intermediate position between the rest position and the upright position.

Due to these measures, it is possible to selectively hide or make appear the pivots linking the first and second elements, thus facilitating the assembly of the pivot and avoiding a potential interference with the second element when the first element pivots.

In preferred embodiments of the invention, one can use one and/or other of the following dispositions:

the turns and lateral edges of the first element each have a convex rounded shape;

the turns each extend from the flap to a pointed end, each turn having a height which decreases from the flap to said end;

the flap is incorporated into a cover covering the first element;

the flap belongs to the first element and is composed of a plastic strip over-molded with foam which is part of a padding belonging to the first element;

the flap is secured to the first element of the seat;

the flap, formed by a plastic strip, is inserted in a sheath covered with part of a cover covering the first element;

the first and second elements are respectively a seat-bottom and a vehicle floor;

the transverse lower edge of the first element is a forward lower edge belonging to the seat-bottom.

BRIEF DESCRIPTION OF THE DRAWINGS

Other characteristics and advantages of the invention will appear in the following description of two of its embodiments, given as a non-limiting examples, and with respect to the drawings enclosed.

On the drawings:

FIG. 1 is a lateral elevation of a seating device according to one embodiment of the invention, comprising a seat whose bottom part is mounted to pivot on the floor of the vehicle;

FIG. 2 is a perspective view of the seat bottom of FIG. 1;

MORE DETAILED DESCRIPTION

Figure 3:
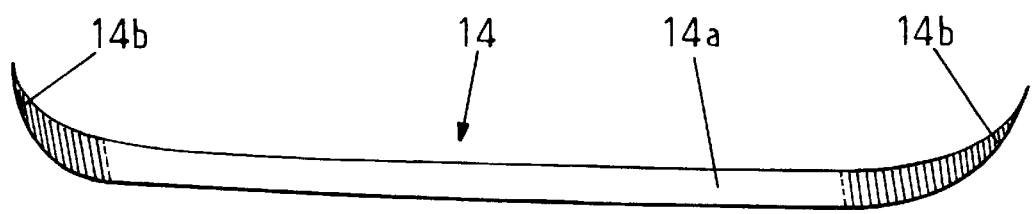
FIG. 3 is a perspective view of a plastic strip forming a flap in the seat bottom of FIG. 2.

On the different figures, the same references indicate identical or similar elements.

The seating device 1 represented in FIG. 1 includes a base 2 forming the floor of the vehicle and a seat borne by the floor.

The seat includes a seat back 3 and a seat bottom 4 which extends between a rear end 6 near the back 3 and a forward end 7 distant from the back 3 (the terms "forward" and "rear" relate solely to the seat and do not prejudge the orientation of the seat in the vehicle).

Figure 4:
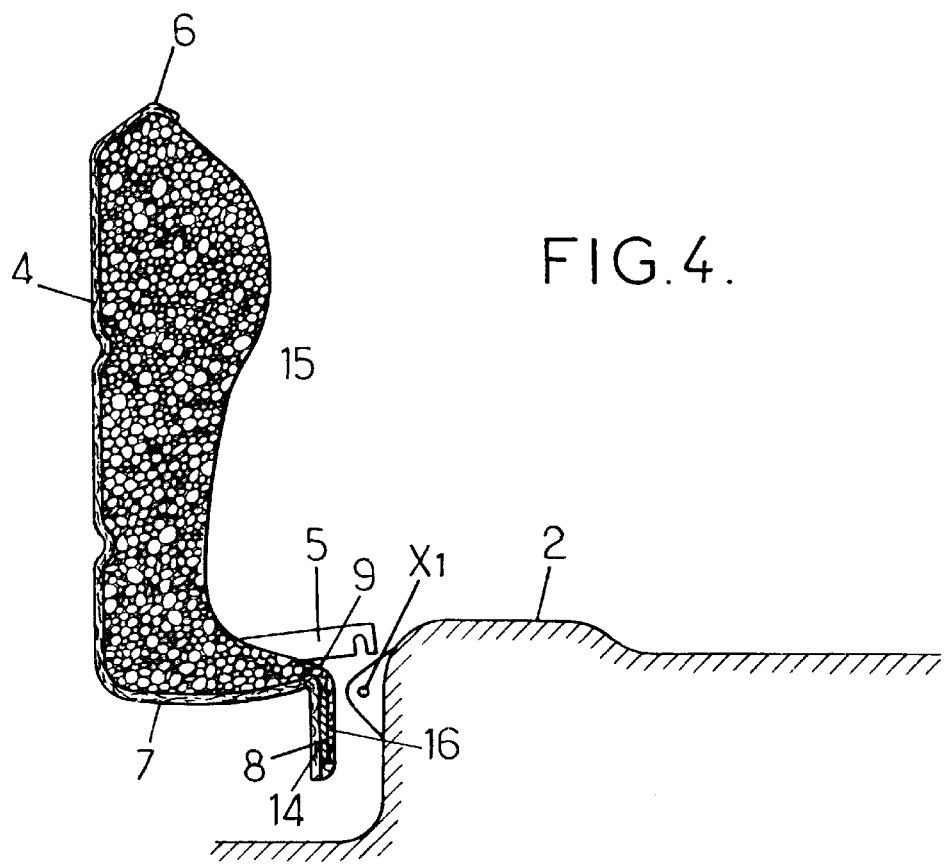
FIG. 4 is a lateral elevation of the seat bottom represented in FIG. 2, before it is mounted on the floor of the vehicle

The seat bottom 4 is mounted so as to pivot on the floor of the vehicle 2 via a connection piece 5 around a horizontal, transverse axis of rotation X1 near the forward extremity 7 of said seat bottom 4 between:

a normal position of use in which the seat bottom 4 occupies a horizontal position substantially parallel with the floor 2 of the vehicle (see FIG. 5), and a vertical upright position in which the seat bottom 4 occupies a substantially perpendicular position with respect to the floor of the vehicle 2 (see FIG. 4).

FIG. 2 is a perspective view of the seat bottom (4).

It includes a seat cushion including foam padding and a flap 8 that is substantially arranged along with the forward end 7 of the seat bottom 4 and on its lower part 9.

This flap 8, represented in FIG. 3, is composed of a rigid plastic strip 14. It includes a transverse edge 14a whose length is substantially equal to the length of the transverse lower edge 9 of the seat bottom. At each of the end of the transverse edge, the flap includes areas forming turns 14b.

The height of these turns, whose basic shape is convex, decreases from the extremity of the transverse edge 14a to their pointed end.

The flap 8 can belong to and be in one piece with the seat bottom 4 or secured to it.

Figure 5:
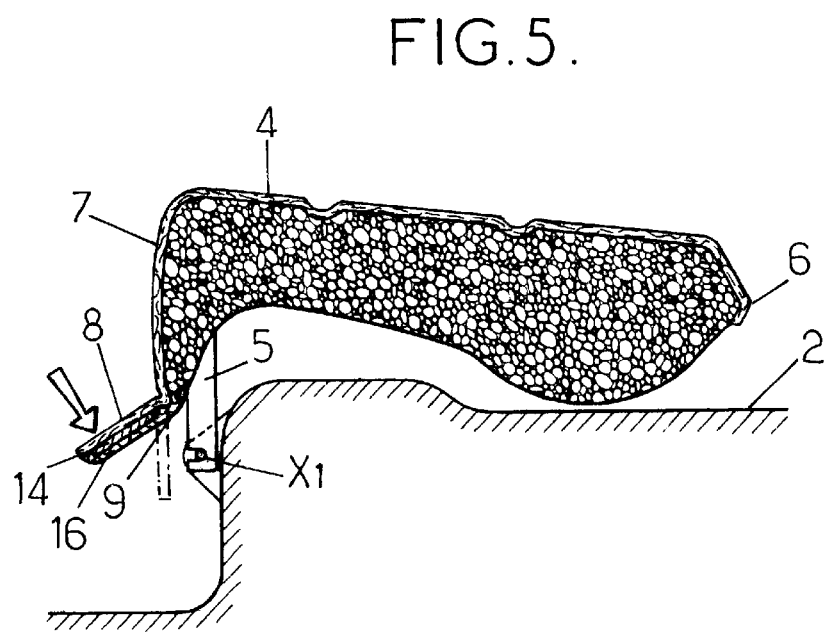
FIG. 5 is a lateral elevation of the seat bottom represented in FIG. 2 when it is mounted on the floor of the vehicle.

In the first embodiment, illustrated in FIGS. 4 and 5, this flap (8) is manufactured in situ at the same time as the seat part. Thus, for example, after placing the cover of the seat element in a mold and positioning the plastic strip (14) in said mold in the correct position corresponding to the lower transverse edge of the seat bottom, the padding 15 of elastomer foam is injected in the mold. The plastic strip 14 is thus enclosed in a layer of foam 16 and the whole, after removal from the mold, forms the seat bottom 4 with its flap 8.

Figure 6:
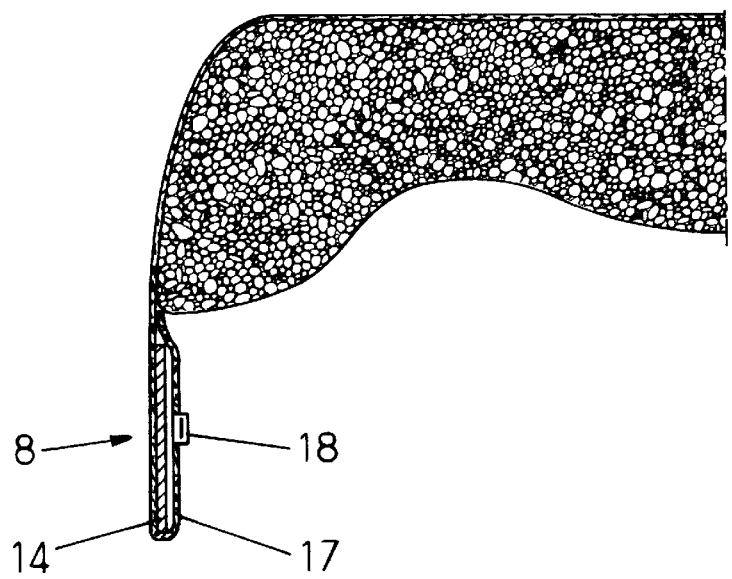
FIG. 6 is a lateral elevation of a seating device according to another embodiment of the invention.

In the second embodiment, illustrated in FIG. 6, the flap 8 comprises a sheath 17 that is directly secured by sewing to the lower edge 9 of the seat bottom 4.

This sheath 17, composed of the same material forming the cover, includes on its inside face, bands 18 that allow the passage of the plastic strip 14. These bands are fixed together via a zip or self-gripping closure, or other. The user slips the plastic strip in the sheath 17 through the bands 18, positions it properly on the transverse edge and its ends 14b, and brings the bands together using the closure.

Whatever the mode of execution, the flap 8 extends transversely along the lower part 8 of the seat bottom 9 and includes at each one of its ends, zones forming the turns 10, 11. These basically convex shaped turns are connected to each of the lateral edges 12, 13 of the seat bottom 4.

This particular mode of connection at the ends of the flap provides the latter with advantageous properties. The flap, which is simultaneously rigid on its transverse edge and flexible on its lateral edges can thus occupy two stable positions, i.e.:

- a first position according to which the flap is basically a downward extension of the front face of the forward extremity 7 of the seat bottom 4 (as illustrated by the dotted line in FIG. 5),
- and a second position, distant from the first position, according to which the flap occupies position that is substantially perpendicular to the front face of the forward end 7 of the seat bottom 4 (as illustrated in FIG. 4).

The transition between the two stable positions of the flap is performed nearly instantaneously under the action of the user similarly to the movement of a "visor on a cap".

On FIG. 4, the flap 8 occupies one of the two stable positions (in this instance the second), and it allows the user to access the joint between the seat bottom 4 and the connecting piece 5 joined to the base 2 connected to the floor of the vehicle. In this position of the flap 8, the user can easily place a tool or position the connecting tab 5 opposite the latch catch connected to the floor of the vehicle.

On FIG. 5, the flap 8 occupies its other stable position (in this instance the first). The flap comes in this position when the user gives a slight movement to the flap 8 in the direction of the arrow: under the elastic effect related to the mounting of the turns 10, 11 of the flap 8 located on the lower part 7 of the seat bottom 4, this flap 8 is then positioned in this stable position and masks or hides the joint between the seat bottom 4 and the connecting piece 5 that is connected to the floor of the vehicle.

Naturally, when the user pushes the flap in the opposite direction of the arrow, it is automatically repositioned in its other position.

It can easily be understood from the above that this finishing device can be installed on another part of the seat between two other seat parts. Thus for example, it can be placed at the base of the back, thus masking the zone between the rear part of the seat bottom and the lower part of the back. Another variant would consist in positioning this flap at the base of a mobile armrest integrated in the seat back.

We claim:

1. Seating device comprising at least a first padded element mounted to pivot with respect to a second element around a horizontal transverse rotation axis, by at least one pivot, the first element including firstly, a transverse lower edge parallel to the rotation axis and neighboring said rotation axis, and secondly, two lateral lower edges extending from the transverse lower edge significantly perpendicularly to the rotation axis, wherein said seating device includes a substantially rigid flap that is pivotally secured along the transverse lower edge of the first element and which is normally in a substantially vertical rest position where said flap hides the pivot, said flap being laterally extended by two flexible turns that are pivotally secured along at least part of the two lateral lower edges of the first element, said turns and the first element having sufficient flexibility to allow the flap to pivot upward until it reaches an upright position by moving away from said turns under user action, the flexibility of the turns and a connection between said turns and the lateral edges of the first element being designed so that:

the flap is normally elastically maintained in its rest position by the turns, and when the flap is made to pivot to its upright position, said flap is elastically pulled upward toward the upright position as soon as said flap has exceeded a neutral intermediate position between the rest position and the upright position.

2. Device according to claim 1, in which the turns and the lateral edges of the first element each have a convex, rounded shape.

3. Device according to claim 2 in which the turns each run from the flap to a pointed end, each turn having a height which decreases from the flap to said end.

4. Device according to claim 1, in which the flap is incorporated into a cover covering the first element.

5. Device according to claim 1 in which the flap belongs to the first element and is composed of a plastic strip over-molded with foam which is part of a padding belonging to the first element.

6. Device according to claim 1 in which the flap is secured to the first element.

7. Device according to claim 6, in which the flap, formed by a plastic strip, is inserted in a sheath covered with part of a cover covering the first element.

8. Device according to claim 1 in which the first and second elements are respectively a seat-bottom and a vehicle floor.

9. Device according to claim 8 in which the transverse lower edge of the first element is a forward lower edge belonging to the seat-bottom.

* * * * *